United States Patent
Bell et al.

(10) Patent No.: US 11,308,537 B1
(45) Date of Patent: Apr. 19, 2022

(54) PROVIDING ALTERNATIVE ITEMS FOR UNAVAILABLE ITEMS

(71) Applicant: Amazon Technologies, Inc., Seattle, WA (US)

(72) Inventors: Adrian Bell, Seattle, WA (US); Andre Wyatt, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 94 days.

(21) Appl. No.: 16/558,667

(22) Filed: Sep. 3, 2019

(51) Int. Cl.
  *G06Q 30/06* (2012.01)
  *G06F 3/04812* (2022.01)

(52) U.S. Cl.
  CPC ..... *G06Q 30/0629* (2013.01); *G06F 3/04812* (2013.01); *G06Q 30/0631* (2013.01); *G06Q 30/0633* (2013.01); *G06Q 30/0643* (2013.01)

(58) Field of Classification Search
  CPC .................................. G06Q 30/06–08
  See application file for complete search history.

(56) References Cited

U.S. PATENT DOCUMENTS

| | | | | |
|---|---|---|---|---|
| 6,266,649 B1* | 7/2001 | Linden | ............. | G06Q 10/08345 705/14.51 |
| 8,117,085 B1* | 2/2012 | Smith | ................. | G06Q 30/0641 705/26.7 |
| 8,490,871 B1* | 7/2013 | Miller | ................. | G06Q 20/3276 235/380 |
| 2009/0063299 A1* | 3/2009 | Amacker | ........... | G06Q 30/0643 705/26.64 |
| 2012/0095879 A1* | 4/2012 | Wijaya | ............... | G06Q 30/0633 705/27.1 |
| 2017/0083966 A1* | 3/2017 | Raman | ............... | G06Q 30/0637 |

OTHER PUBLICATIONS

10 Ways to Increase Ecommerce Conversion Rates Using Modal Windows, Yulia Novozhilova, Jun. 29, 2017, available at: https://monetate.com/blog/10-ways-to-use-modal-windows-to-increase-ecommerce-conversion-rates/, hereafter (Novozhilova). (Year: 2017).*
Marketing 101: What is a lightbox?, Courtney Eckerle, Aug. 4, 2017, available at: https://sherpablog.marketingsherpa.com/email-marketing/what-is-a-lightbox/ (Year: 2017).*
How to Create Lightbox Popups That Work, Aug. 29, 2017, https://wisepops.com/how-to-create-lightbox-popups-that-work/ (Year: 2017).*

* cited by examiner

*Primary Examiner* — Ming Shui
(74) *Attorney, Agent, or Firm* — Thomas | Horstemeyer, LLP

(57) ABSTRACT

Disclosed are various embodiments for providing an item purchase experience for users wishing to repeat purchases of items when previously purchased items are out-of-stock or otherwise temporarily unavailable. Alternative items are identified for an item that is determined to be unavailable. A user interface is generated to include a listing of previously purchased items, including an item listing for the unavailable item. The item listing for the unavailable item further includes the alternative items for display and user interaction.

20 Claims, 8 Drawing Sheets

US 11,308,537 B1

PROVIDING ALTERNATIVE ITEMS FOR UNAVAILABLE ITEMS

BACKGROUND

An electronic commerce system may include listings of items offered for sale, lease, download, rent, etc., by many different merchants. Users may use the electronic commerce system to purchase, lease, download, rent, etc., items of interest. In some instances, users may wish to repeat behavior with respect to particular items of interest. However, sometimes particular items of interest may be out-of-stock or temporarily unavailable on the electronic commerce system.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to improving a user experience for a user interacting with an electronic commerce system to purchase items when some items of interest to the user or user account may be out-of-stock or otherwise unavailable. In particular, when a user requests to view items (e.g., previously purchased items, saved items, recommended items, etc.) that are currently out-of-stock or otherwise temporarily unavailable, alternative items that are similar to the unavailable item can be identified from an item catalog and presented to the user with respect to the unavailable item.

According to various embodiments of the present disclosure, a user can request to view a listing of items available for sale, lease, download, rent, etc. by different merchants through the electronic commerce system. Providing a user a listing of items in a single interface allows the user the opportunity to easily select items that the user may wish to purchase and/or repurchase without having to search through the item catalog to discover items of interest. For example, assume that the electronic commerce system includes grocery store items. A user may typically purchase specific types of items such as bread (e.g., wheat), milk (e.g., 2% organic), fruit (e.g., green apples), and eggs (e.g., organic brown eggs) on a weekly basis. When the user requests to view a listing of previously purchased items, the user can be presented with a user interface that includes previously purchased items that facilitates the repurchase of items by the user through interactions with a single interface.

Figure 1A:
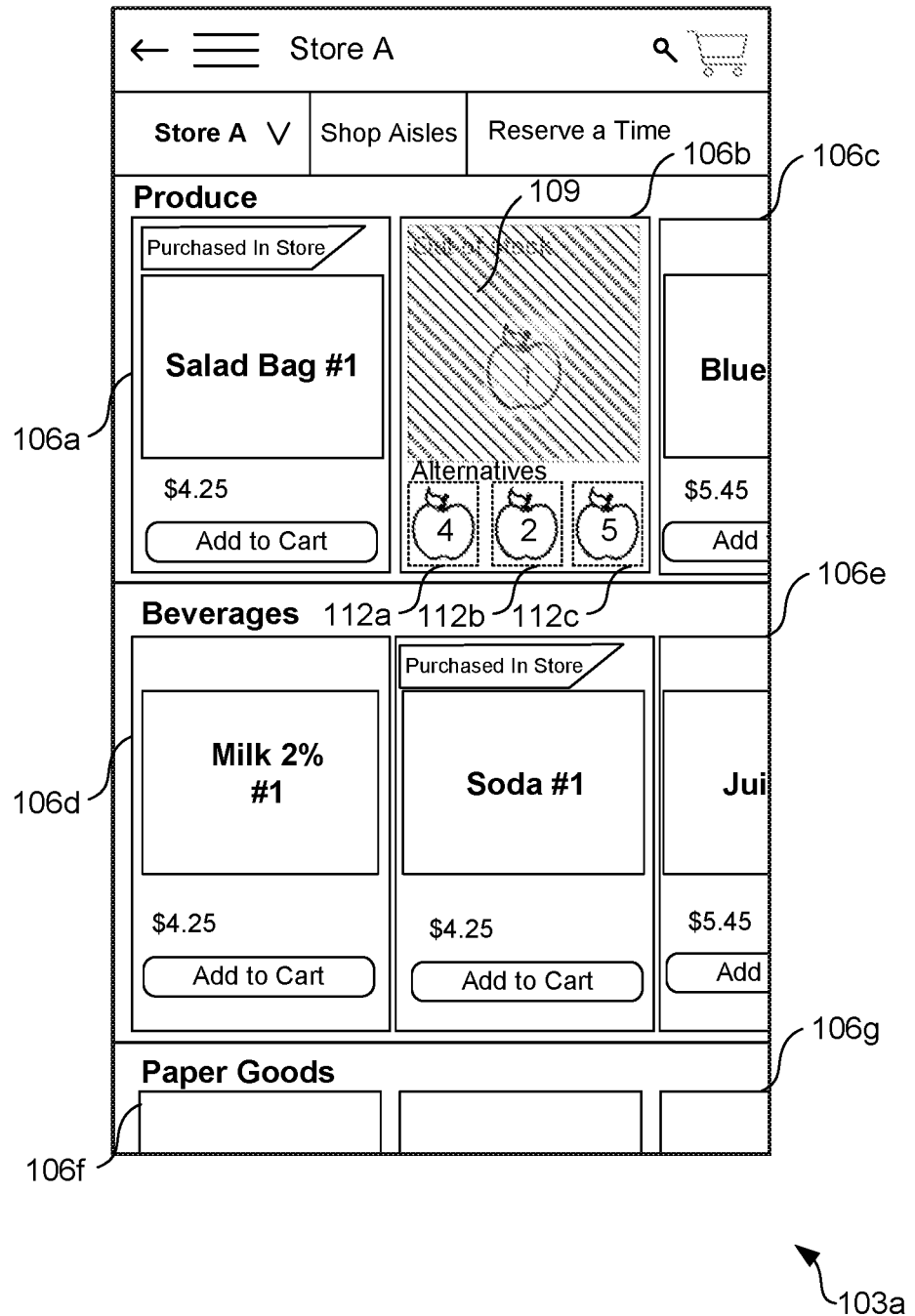
FIGS. 1A-1B are pictorial diagrams of example user interfaces rendered by a client device according to various embodiments of the present disclosure.
Figure 1B:
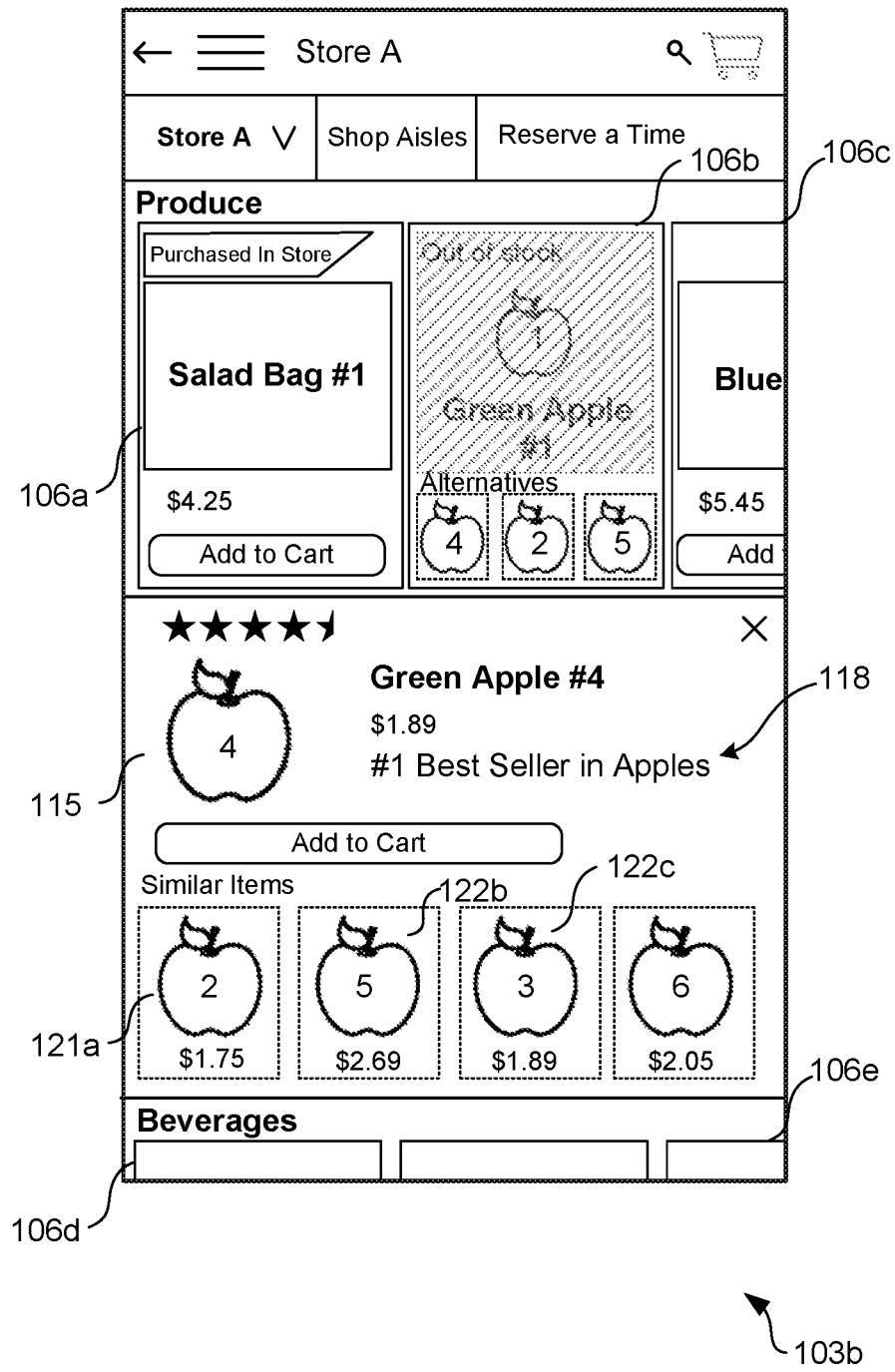

FIGS. 1A and 1B illustrate examples of user interfaces 103 (e.g., 103a, 103b) that include multiple item listings 106 (e.g., 106a, 106b, 106c, 106d, 106e, 106f, 106g) of items that have been previously purchased by the user in accordance with various embodiments of the present disclosure. According to various embodiments, the item listings 106 associated with the different items can be arranged in the user interface 103a according to a category type associated with the item (e.g., produce, meat, beverages, etc.), a user preference, a frequency of purchase, a recency of purchase, a cadence of purchase (e.g., purchased item every three months), recommendations, and/or other factors as can be appreciated.

In FIGS. 1A and 1B, the item associated with item listing 106b is visually identified as being unavailable and alternative items are included in the item listing 106b. FIG. 1A illustrates an example user interface 103a that may be initially presented to the user in response to a request for a list of items. In this example, an item included in the list of items is determined to be unavailable and alternatives are presented, but no additional information about the alternative items is presented. FIG. 1B illustrates an example user interface 103b that may be displayed as a result of a user interaction with the user interface 103a to provide additional information to the user with respect to a particular alternative item.

In the example of FIG. 1A, assume that the user has typically purchased "Green Apple #1" associated with item listing 106b, which indicates that the item is out-of-stock. Although "Green Apple #1" is unavailable through the electronic commerce system because the item is out-of-stock, alternative items, "Apple 4," "Apple 2," and "Apple 5" are presented to the user as available items that are identified as being similar to "Green Apple #1." According to various embodiments of the present disclosure, the available items are identified as being similar to the unavailable item based at least in part on a comparison of item characteristic and are presented to the user as alternative recommendations.

To visually distinguish the unavailable item from the alternative items and to further assist the user in identifying the alternative items, the unavailable item may be associated with a first user interface component 109 and the available alternatives are associated with second user interface components 112 (e.g., 112a, 112b, 112c). According to various embodiments, the first user interface component 109 is disabled such that no resulting action occurs when a user interacts (e.g., hover action, component selection, mouse click, etc.) with the area associated with the first user interface component 109. Further, as shown in FIGS. 1A and 1B, the display region of the first user interface component 109 may be dimmed, shaded, transparent, or otherwise grayed-out to signify to the user that the item is unavailable for purchase.

Unlike the display region associated with the first user interface component 109 (e.g., the unavailable item), the display regions corresponding to the second user interface components 112 associated with the alternative items are fully visible to the user (e.g., not dimmed, shaded, transparent, or grayed-out). Further, the second user interface components 112 may be enabled and configured to trigger an action in response to a user interaction (e.g., hover action, component selection, etc.). For example, the action may correspond to a modification of a user interface view to include additional information regarding the respective alternative item associated with the interacted second user interface component 112.

As shown in FIG. 1B, the user interface view is modified to include a user interface element 115 that includes additional information about the selected alternative item associated with second user interface component 112a. The modification occurs in response to a user interaction with the second user interface component 112 of FIG. 1A. The user interface element 115 in FIG. 1B corresponds to a card component that is positioned between a first row of item listings 106 and a second row of item listings 106. Although the user interface element 115 of FIG. 1B is a card component, the user interface element 115 can comprise an overlay interface, a pop-up component, drop-down box, and/or other type of user interface element 115 as can be appreciated.

According to various embodiments, the additional information included in the user interface element 115 may include item attributes (e.g., an item price) for the alternative item, a description of the alternative item, a notification 118 including an item characteristic that may indicate to the user why the alternative item was recommended (e.g., top seller, conventional version of unavailable item (e.g., non-organic version if unavailable item is organic), most similar in texture, etc.) and/or other information associated with the item. In some examples, the user interface element 115 may include selectable components configured to initiate a purchase of the alternative item, remove the alternative item from consideration, and/or otherwise allow the user to provide feedback regarding the recommendation.

In some embodiments, the user interface element 115 may include additional item components 121 (e.g., 121a, 121b, 121c) that correspond to the remaining alternative items not interacted with in the item listing 106b and/or additional recommended items. According to various embodiments, a user interaction with an additional item component 121 causes the user interface element 115 to be updated to correspond to the other alternative item associated with the additional item component 121. The user interface element 115 can also include a closure component, that upon selection, removes the user interface element 115 from the user interface 103, thereby causing the user interface 103 to return to the original view, as shown in FIG. 1A.

As one skilled in the art will appreciate in light of this disclosure, certain embodiments may be capable of achieving certain advantages, including some or all of the following: (1) reducing computer resource utilization (e.g., memory consumption, processor utilization, network transfer, etc.) by avoiding the need to individually search an online catalog for items when an item of interest is out-of-stock or otherwise unavailable through an electronic commerce system; (2) improving the user experience in interacting with a computer system by automatically identifying alternative items so the user is no longer required to search for an alternative item when an item of interest is no longer available; (3) improving the functioning of the computing system through a more streamlined repurchase process that reduces user frustration when items of interest are unavailable; (4) improving the user experience in interacting with a computer system by providing a user interface that prevents a selection of an out-of-stock item and provides information in context of selectable alternative items; and so forth. In the following discussion, a general description of the system and its components is provided, followed by a discussion of the operation of the same.

Figure 2:
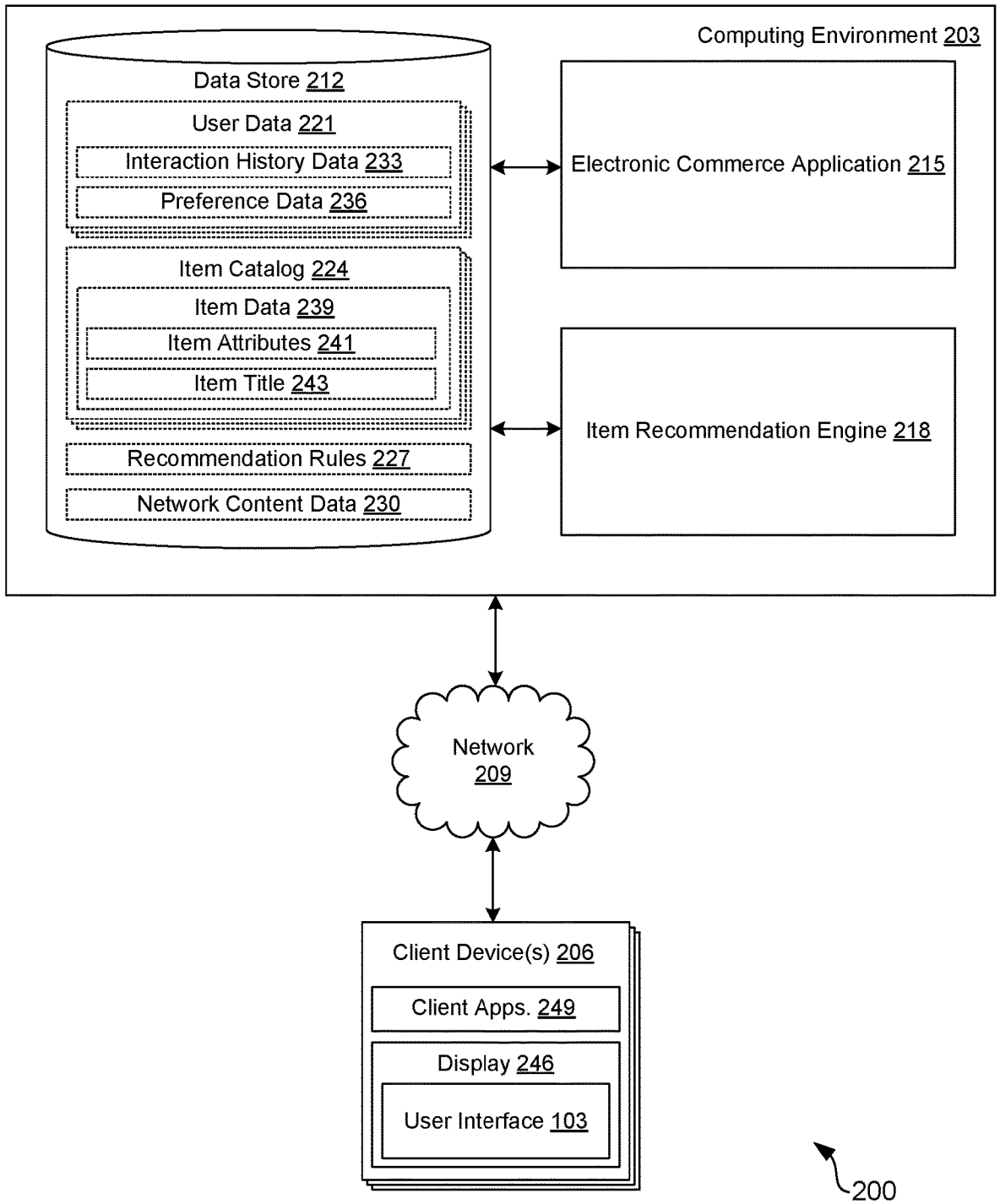
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client device(s) 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed in the computing environment 203, for example, include an electronic commerce application 215, an item recommendation engine 218, and other applications, services, processes, systems, engines, or functionality not discussed in detail herein.

The electronic commerce application 215 is executed in order to facilitate the online sale, download, lease, rent, etc. of items from one or more electronic commerce systems over the network 209. Such items may include products, goods, services, digital content, and/or other items. The electronic commerce application 215 also performs various backend functions associated with the online presence of an electronic commerce system in order to facilitate the online purchase of items. For example, the electronic commerce application 215 generates network pages such as, for example, web pages and/or other types of network content that are provided to client devices 206 for the purposes of promoting and selecting items for purchase, rental, download, lease, or any other forms of consumption.

The item recommendation engine 218 is executed to identify alternative items for out-of-stock or otherwise temporarily unavailable items when generating a listing of previously purchased items offered for sale, lease, rent, download, etc., via one or more electronic commerce systems. To this end, the item recommendation engine 218 may identify items within the item catalog 224 that can be considered similar to the unavailable item. In some embodiments, the item recommendation engine 218 may evaluate one or more factors associated with the user, the unavailable item, and items in the same category to identify alternative items. The factors may include for example, item data (e.g., attributes, item title, price, etc.), interaction history data 233, preference data 236, and/or other factors. For example, item attributes 241, item titles 243, and other factors associated with items in the same category as the unavailable item can be compared with the unavailable item to determine a similarity. Further, interaction history data 233 can be used to determine if the user has had a negative or positive interaction (e.g., reject a recommendation, purchase an item, etc.) with any given item.

In some embodiments, the item recommendation engine 218 may assign a weight to each of the factors and generate a score for each item based in part on one or more factors. To this end, the item recommendation engine 218 may rank the similar items based at least in part on the score and select the highest ranked items according to the ranking. In some embodiments, the alternative items can be selected based on preferences associated with the user.

The data stored in the data store 212 includes, for example, user data 221, an item catalog 224, recommendation rules 227, network content data 230, and potentially other data. The user data 221 includes various data collected from or generated by users and/or customers having accounts in an electronic commerce site facilitated by the electronic commerce application 215. The user data 221 may include interaction history data 233, preference data 236, account address(es), payment instrument data, authentication information, and/or other data associated with a user or user account of the electronic commerce site.

The interaction history data 233 may include information specific to a user such as, for example, a purchase history (including, for example, a purchase frequency, a purchase recency, a purchase cadence, etc.), a browsing history, a viewing history, a rating history, and/or other information that reflects a prior interaction of the user with the computing environment 203. The preference data 236 may include information related to preferences of items, item attributes, brands of items, quality of items, quantity of items, and/or other information.

The item catalog 224 includes item data 239 regarding items offered through the electronic commerce application 215. Such items may include products, goods, services, digital content, and/or other items that can be offered for sale, lease, rent, download, etc. The items in the item catalog 224 may be organized according to a taxonomy of categories. For example, the items in the item catalog 224 can be categorized according to an item type with various item attributes 241 further defining a placement of an item in the taxonomy. For example, duck eggs and chicken eggs can include two branches of the taxonomy under a category for "eggs." Further, the category associated with chicken eggs, for example, may further include branches according to size, color, whether they are organic, and so on.

The item data 239 may include item attributes 241, item title(s) 243, an item identifier, descriptions, weights, prices, quantities available, export restrictions, customer reviews, customer ratings, images, videos, version information, availability information, shipping information, and/or other data. Item attributes 241 can include specific characteristics that define a given item. For example, item attributes 241 can include size, color, weight, packaging, quantity, freshness, ripeness, nutritional values, how the item is processed, brand, and/or other attributes as can be appreciated. The item title 243 can include a title associated with the item that can be used to further define item attributes 241 and determine placement in the item catalog 224 for the item. According to various embodiments, alternative items for an unavailable item can be identified based at least in part on the item title 243, the item attributes 241, and/or other features.

The recommendation rules 227 include rules, models, and/or configuration data for the various algorithms or approaches employed by the item recommendation engine 218. For example, the recommendation rules 227 can include the various models and/or algorithms used by the item recommendation engine 218 in identifying and selecting alternative items for an out-of-stock or otherwise temporarily unavailable item.

For example, the recommendation rules 227 may include select items according to whether the item is an identical item, whether the item is in a same category of the item catalog 224 as the unavailable item, whether one or more words in item titles 243 match (e.g., identical, synonyms, known to be related, etc.), whether a ratio between quantities between different items is within a predefined threshold (e.g., ratio between quantity of item A and unavailable item B is greater than 0.5 and less than 3.5), and/or other factors.

For example, by applying the recommendation rules 227, the item recommendation engine 218 can tokenize the item titles 243 to identify matching words (e.g., identical, synonyms, related) between item titles 243. When one or more words in an item title 243 for a particular item in a same category as the unavailable item are determined to match according to the recommendation rules 227, the item recommendation engine 218 can determine that the particular item may remain in consideration for being an alternate item.

In some examples, the recommendation rules 227 include weights that can be applied to various factors including, for example, item data 239 (e.g., item attributes 241, item title 243, price, etc.), preference data 236, interaction history data 233, and/or other data in determining a similarity between potential recommendation items in the item catalog 224 and the unavailable item. In some examples, based at least in part on the recommendation rules 227, the item recommendation engine 218 can generate a score for each item, rank the scores, and select a subset of the highest ranked items (e.g., top 3) as the alternative items for the unavailable item.

In some examples, only items having a score that exceeds a predefined threshold are selected and/or considered as a potential alternative item. In some examples, a subset of potential alternative items are identified according to item attributes 241 and item title 243, and after the subset of potential alternative items are identified, the alternative items are selected according to user preference data 236 and/or other factors.

The network content data 230 may include various data employed in generating user interfaces 103 and/or other network pages. The network content data 230 may include hypertext markup language (HTML), extensible markup language (XML), cascading style sheets (CSS), images, text, audio, video, templates, and/or other data.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 246. The display 246 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 249 and/or other applications. The client application 249 may be executed in a client device 206, for example, to access network content served up by the computing environment 203 and/or other servers, thereby rendering a user interface 103 on the display 246. To this end, the client application 249 may comprise, for example, a browser, a dedicated application, etc., and the user interface 103 may comprise a network page, an application screen, etc. The client device 206 may be configured to execute applications beyond the client application 249 such as, for example, email applications, social networking applications, word processors, spreadsheets, and/or other applications.

Next, a general description of the operation of the various components of the networked environment 200 is provided. To begin, a user interacting with the electronic commerce application 215 may want to view items of interest. As such, the user can request to view a listing of items that may be of interest to the user (e.g., previously purchased items, items saved in a wish list, previously recommended items, etc.). The electronic commerce application 215 can identify the list of items from the interaction history data 233. For example, for previously purchased items, the electronic commerce application 215 can identify the list of items based at least in part on the purchase history and the item identifiers associated with each previously purchased item. According to various embodiments, the electronic commerce application 215 can generate a user interface 103 including the listing of items arranged according to an item category, a frequency of purchase, a recency of purchase, a cadence of purchase, a recommendation, and/or other factors.

However, in some situations, an item that may be included in the requested list of items may be out-of-stock or otherwise temporarily unavailable. According to various embodiments, when the electronic commerce application 215 determines that an item is unavailable, the item recommendation engine 218 can determine if there are any alternative items available for the unavailable item. For example, the item recommendation engine 218 can determine a category in the taxonomy of the item catalog 224 and compare item attributes 241, item title 243, and/or other factors associated with the unavailable item with those items included in the same category of the item catalog 224 to determine if there are any similarly related items. If there are no other related items in the same category as the unavailable item, the electronic commerce application 215 may present the listing of items with a disabled item listing that indicates that the unavailable item is not currently available for sale, rent, download, lease, etc.

However, if there are similarly related items included in the same category as the unavailable item, the item recommendation engine 218 may analyze each of the identified items prior to selecting alternative items to present to the user. It should be noted that the alternative items can include items that were previously available to the user and are not limited to newly added items to the item catalog 224.

In some embodiments, the item recommendation engine 218 can apply the recommendation rules 227 to select the alternative items. For example, according to the recommendation rules 227, the item recommendation engine 218 may evaluate one or more factors (e.g., item attributes 241, item title 243, interaction history data 233, preference data 236, user location and/or region, etc.) to identify similar items and generate a score for each item based in part on one or more factors.

According to various embodiments, the recommendation rules 227 may define one or more weights to be assigned to each factor associated with the items. In some examples, the weights assigned to the different factors can vary. For example, attributes associated with the unavailable item can be compared to attributes associated with the prospective alternative items. If there is a match between an attribute of a respective alternative item and an attribute of the unavailable item, the respective alternative item may be assigned a particular weight (e.g., positive weight). Likewise, if there is not a match between attributes, the respective alternative item may be assigned another weight (e.g., negative, zero). Further, based on the type of factor, the weights may vary according to a level of importance associated with the factor. In some embodiments, the level of importance can be based at least in part on the preference data 236 associated with the user (e.g., organic vs. non-organic preference, dietary restriction, etc.).

In other embodiments, the level of importance is predefined. For example, a similarity in quantity may be considered to have a greater level of importance than a similarity between sizes. As such, a similarity in quantity between the compared items may be assigned a greater weight than a size of the items. For example, assume that the unavailable item corresponds to a single ripe avocado with an item title 243 of "Single Avocado," and the category of avocados includes single ripe avocados, single unripe avocados, a bag of avocados, organic avocados, etc. To this end, item recommendation engine 218 may determine based at least in part on an item title 243 and item attributes 241 that another item that corresponds to a single ripe avocado with an item title 243 of "Avocado" is more similar to an item that corresponds to a single unripe avocado having an item title 243 "Avocado" or a bag of ripe avocados having an item title 243 of "4-pack of Avocados."

In some examples, the item recommendation engine 218 may determine a ratio between the quantity associated with a particular item and a quantity associated with the discontinued item. If the ratio is within a predefined threshold or threshold range, the item may continue to be considered as an alternative. If the ratio is outside of a predefined threshold range, the item may be eliminated from consideration or may receive a lower and/or negative weight with respect to quantity.

In some examples, the item recommendation engine 218 may select the alternative items according to specific characteristics (e.g., top selling product, price, texture, how the item is processed or manufactured, etc.) associated with the alternative items and/or the user data 221. For example, the item recommendation engine 218 may select an alternative item based at least in part on the alternative item being the top seller of the similarly related items. In this example, the top selling product may correspond to a top selling product for a particular region. For example, the region may correspond to a geographic area (e.g., zip code, group of zip codes, state, city, etc.) associated with the user and/or client device 206.

In some examples, a context associated with a current user experience may be a factor associated with identifying similar items. For example, the item recommendation engine 218 may be able to identify already selected items of interest associated with a particular shopping experience and may be able to determine that the items are all related to a particular context, such as, for example, a recipe. If the unavailable item is an apple and the context is identified as shopping for items to make a pie, the item recommendation engine 218 may identify cherries instead of the unavailable apple.

Upon analyzing each of the identified similar items, the item recommendation engine 218 may rank the similar items based at least in part on the score and select alternative items (e.g., top 3) according to the ranking.

After selecting alternative items, the electronic commerce application 215 can generate a user interface 103 including a listing of items to be rendered on a display 246 of the client device 206. According to various embodiments, the user interface 103 can include multiple item listings 106 that are associated with a requested list of items (e.g., previously purchased items).

In some embodiments, as shown in FIGS. 1A-1B and 3A-3B, the user interface 103 may be generated to include an item listing 106 associated with the unavailable item. According to various embodiments, the item listing 106 may include a first user interface component 109 corresponding to the unavailable item and second user interface components 112 corresponding to the available alternative items. According to various embodiments, the first user interface component 109 is disabled such that no resulting action occurs when a user interacts (e.g., hover action, component selection, mouse click, etc.) with the area associated with the first user interface component 109. In various embodiments, the display region of the first user interface component 109 may be dimmed, shaded, transparent, or otherwise grayed-out to signify to the user that the item is unavailable for purchase.

The display regions corresponding to the second user interface components 112 associated with the alternative items are fully visible to the user. According to various embodiments, the second user interface components 112 may be enabled and configured to trigger an action in response to a user interaction (e.g., hover action, component selection, etc.). For example, the action may correspond to a modification of a user interface view to include additional information regarding the respective alternative item associated with the interacted second user interface component 112.

According to various embodiments, upon selection of a respective second user interface component 112, the user interface view of the user interface 103 can be modified to include a user interface element 115 (FIG. 1B) that provides additional information about the alternative item associated with the particular second user interface component 112. According to various embodiments, the user interface element 115 may comprise an overlay interface, a pop-up component, a card component or other type of inline expansion component, and/or other type of user interface object as can be appreciated. For example, as shown in FIG. 1B, in response to a user selecting a second user interface component 112 associated with a particular alternative item, the user interface 103 can be modified such that a user interface element 115 (e.g., a card component) slides down as an inline expansion to provide additional information associated with the selected alternative item.

The additional information includes item attributes (e.g., an item price) for the alternative item, a description of the alternative item, a notification 118 including an item characteristic that may indicate to the user why the alternative item was recommended (e.g., top seller, conventional version of unavailable item (e.g., non-organic version if unavailable item is organic), most similar in texture, etc.) and/or other information associated with the item. The user interface element 115 can further include selectable components that allow a user to remove the item from consideration and/or initiate the purchase of the item. Further, the user interface element 115 can include additional item components 121 associated with the remaining alternative items. Interaction with any one of the additional item components 121 may cause the information in the user interface element 115 to update to include information corresponding to the respective other alternative item.

In some embodiments, in response to a detected user action, the client device 206 rendering the user interface 103 can transmit the interaction data associated with the user interaction with the second user interface component 112 to the electronic commerce application 215. Upon receipt of the user interaction data, the electronic commerce application 215 may generate an updated user interface 103 that provides additional information about the selected alternative item. For example, the updated user interface 103 can include a card component or other type of inline expansion component, pop-up box, or other type of user interface element 115 that provides additional information to the user. Upon generating the updated view, the electronic commerce application 215 transmits the updated user interface 103 to the client device 206 for rendering.

In other embodiments, the user interface 103 may comprise user interface code for imparting functionality to the second user interface component 112 and for rendering subsequent views of the second user interface component 112 in the client device 206. For example, the client application 249 may execute the user interface code of the user interface 103 to generate an updated user interface view that includes a user interface element 115 that presents the additional information to the user.

Figure 3A:
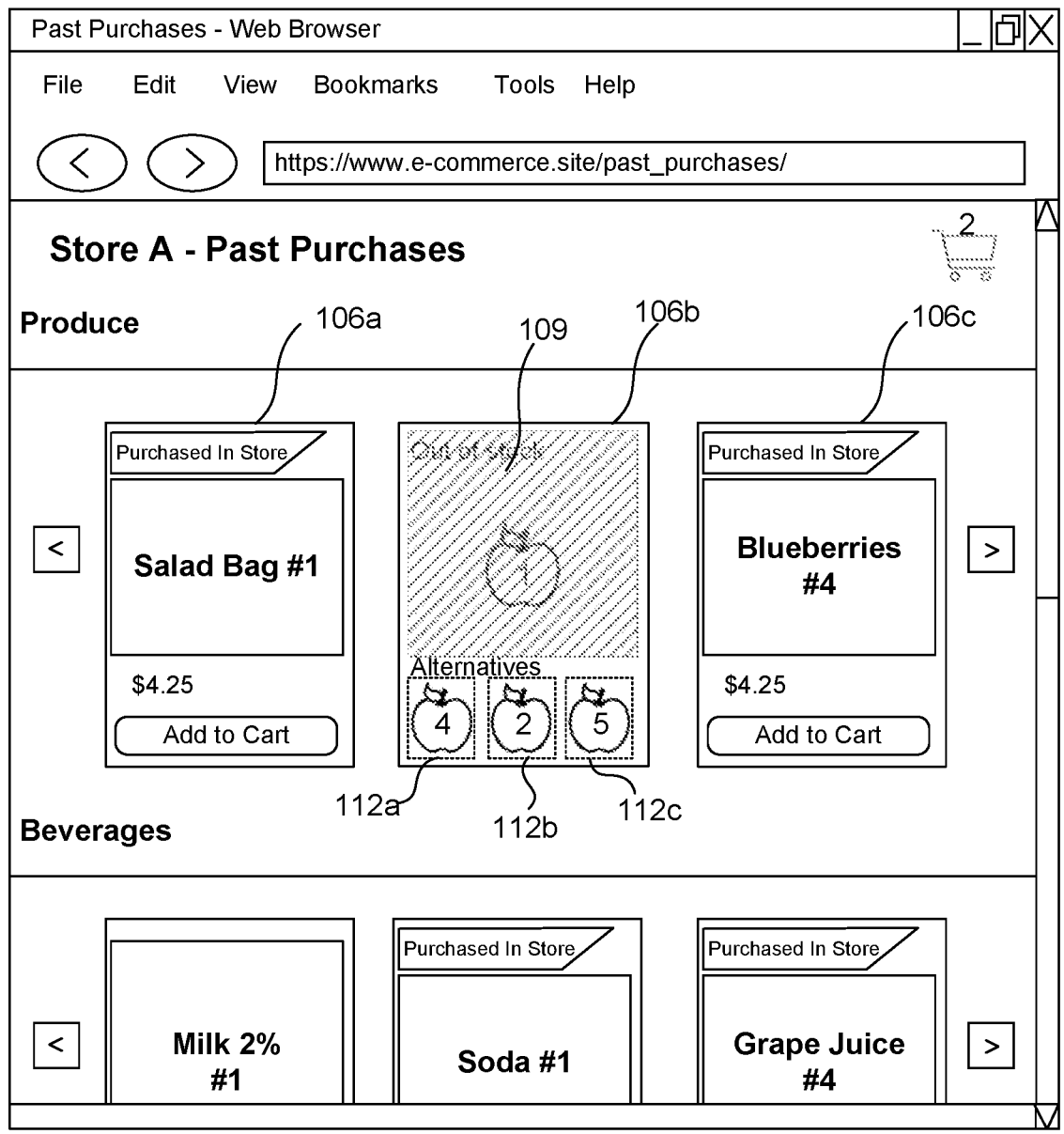
FIGS. 3A-3B are pictorial diagrams of example user interfaces rendered by a client device in the networked environment of FIG. 2 according to various embodiments of the present disclosure.
Figure 3B:
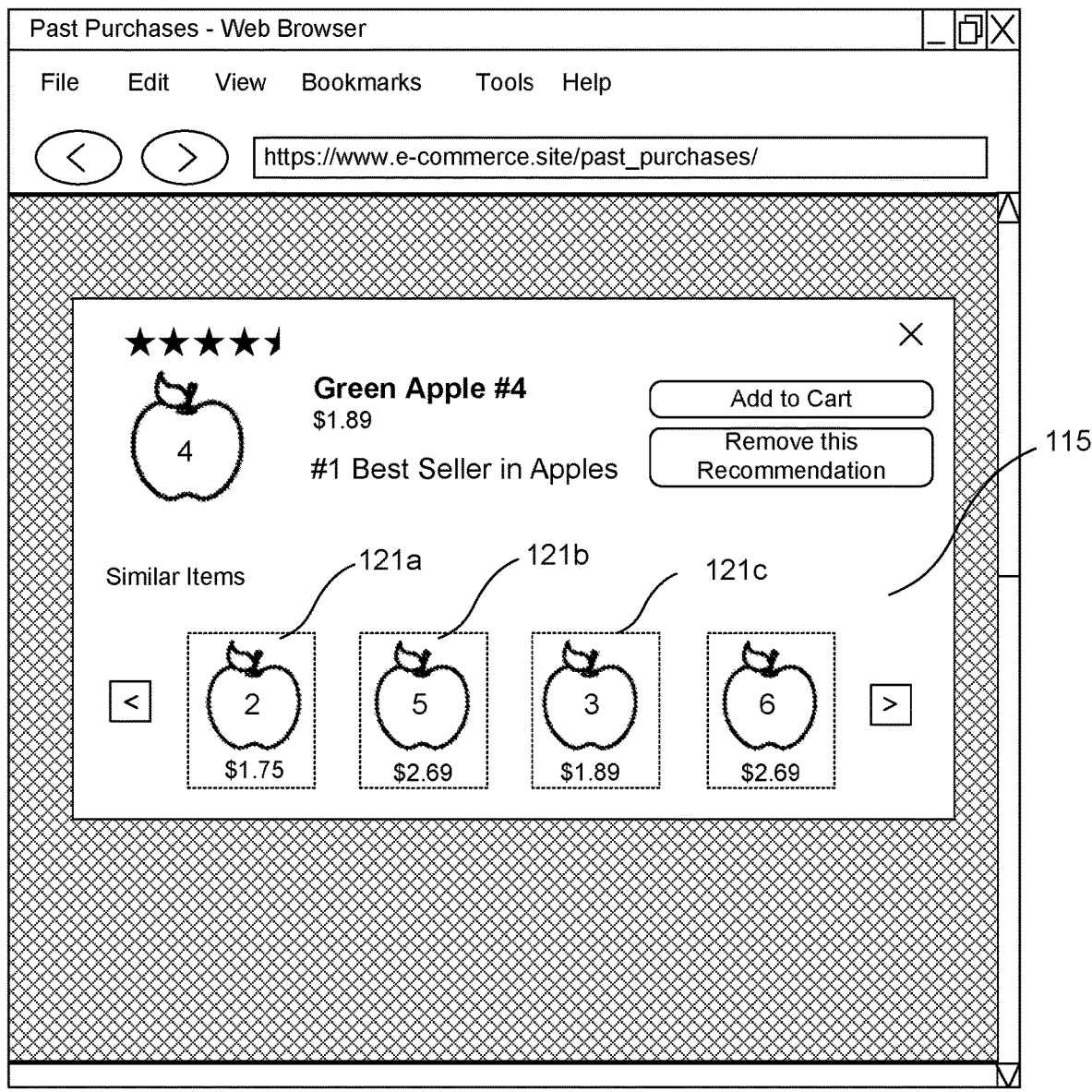

Turning now to FIGS. 3A-3B, shown are example user interfaces 103 including item listings 106 for items available for purchase through the electronic commerce application 215 (FIG. 2) according to various embodiments of the present disclosure. In particular, FIGS. 3A-3B illustrate example user interfaces 103 associated with desktop or laptop device views while FIGS. 1A and 1B provided example user interfaces 103 associated with mobile views. It should be noted that the user interface elements 115 discussed with respect to FIGS. 1A-1B and 3A-3B are not limited to use on mobile devices or desktop or laptop devices, respectively, and can be interchanged as can be appreciated. The user interfaces 103 of FIGS. 3A-3B provide examples of alternative items being presented to the user in association with unavailable items. The alternative items are associated with various second user interface components 112 that trigger modification of the user interface 103 to provide additional information with respect to an alternative item.

Similar to FIG. 1A, FIG. 3A illustrates an example user interface 103c that may be initially presented to the user in response to a request for a list of items. In this example, an item included in the list of items is determined to be unavailable. To visually distinguish the unavailable item from the alternative items, and to further assist the user in identifying the alternative items, the unavailable item is associated with a first user interface component 109 and the available alternatives are associated with second user interface components 112 (e.g., 112a, 112b, 112c). According to various embodiments, the first user interface component 109 is disabled such that no resulting action occurs when a user interacts (e.g., hover action, component selection, mouse click, etc.) with the area associated with the first user interface component 109. Further, as shown in FIGS. 3A and 3B, the display region of the first user interface component 109 may be dimmed, shaded, transparent, or otherwise grayed-out to signify to the user that the item is unavailable for purchase.

Unlike the display region associated with the first user interface component 109 (e.g., the unavailable item), the display regions corresponding to the second user interface components 112 associated with the alternative items are fully visible to the user. Further, the second user interface components 112 may be enabled and configured to trigger an action in response to a user interaction (e.g., hover action, component selection, etc.). For example, the action may correspond to a modification of a user interface view to include additional information regarding the respective alternative item associated with the interacted second user interface component 112.

FIG. 3B illustrates an example user interface 103d that may be displayed in response to a user interaction with the second user interface component 112a of FIG. 3A in accordance to various embodiments of the present disclosure. In FIG. 3B, the user interface 103c from FIG. 3A is modified to include a user interface element 115 that includes additional information about the selected alternative item associated with the second user interface component 112a. The modification occurs in response to a user interaction with the second user interface component 112a of FIG. 3A. The user interface element 115 in FIG. 3B is presented in the form of a pop-up window. Although the user interface element 115 of FIG. 1B is a card component represented as an inline expansion, the user interface element 115 can comprise an overlay interface, a pop-up component, and/or other type of user interface element 115 as can be appreciated.

The user interface element 115 of FIG. 3B includes an item price, an item title 243, a notification 118 (FIG. 1B) including an item characteristic that may indicate to the user why the alternative item was recommended (e.g., top seller, conventional version of unavailable item (e.g., non-organic version if unavailable item is organic), most similar in texture, etc.), and an item rating. The user interface element 115 further includes selectable components configured to initiate a purchase of the alternative item and remove the alternative item from consideration.

Additionally, the user interface element 115 of FIG. 3B includes additional item components 121 (e.g., 121a, 121b, 121c) that correspond to the remaining alternative items not interacted with in the item listing 106b and/or additional recommended items. According to various embodiments, a user interaction with an additional item component 121 may cause the user interface element 115 to be updated to correspond to the other alternative item associated with the additional item component 121. The user interface element 115 also includes a closure component, that upon selection, causes the user interface 103 to return to the original view in user interface 103c, as shown in FIG. 3A.

Figure 4:
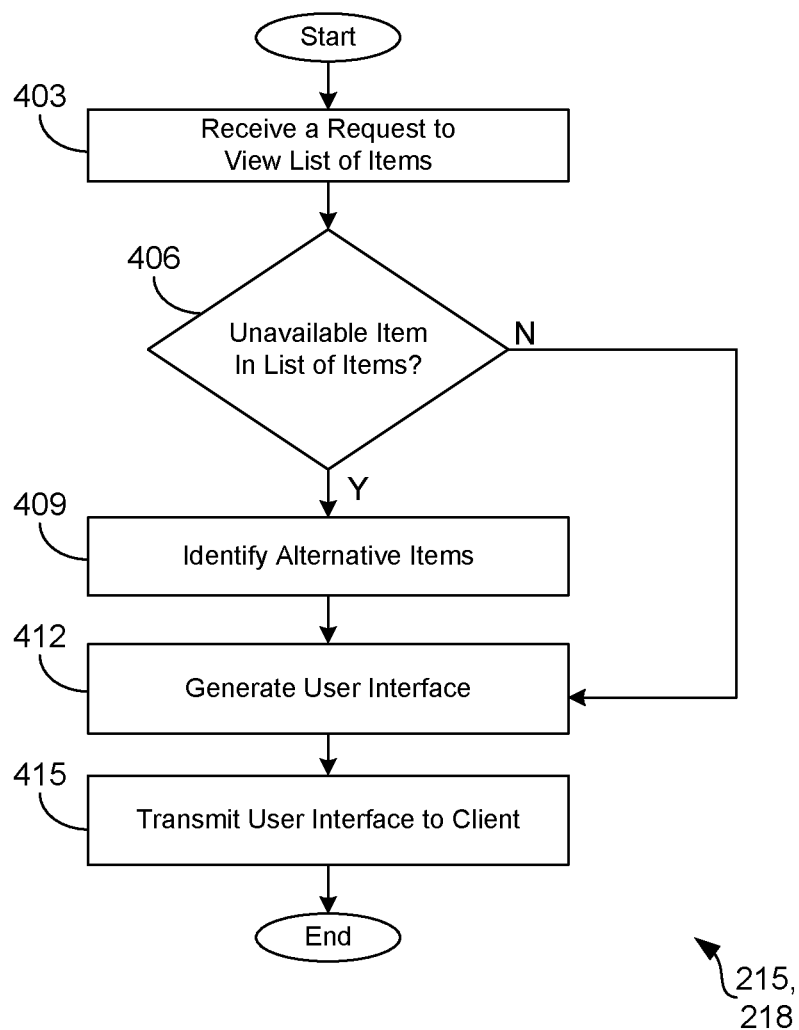
FIG. 4 is a flowchart illustrating examples of functionality implemented as portions of an electronic commerce application and an item recommendation engine executed in a computing environment in the networked environment of FIG. 2 according to various embodiments of the present disclosure.

Referring next to FIG. 4, shown is a flowchart that provides one example of the operation of portions of the electronic commerce application 215, the item recommendation engine 218, and/or other applications according to various embodiments. It is understood that the flowchart of FIG. 4 provides merely an example of the many different types of functional arrangements that may be employed to implement the operation of the portions of the electronic commerce application 215, the item recommendation engine 218, and/or other applications as described herein. As an alternative, the flowchart of FIG. 4 may be viewed as depicting an example of elements of a method implemented in the computing environment 203 (FIG. 2) according to one or more embodiments.

Beginning with box 403, the electronic commerce application 215 receives a request to view a list of items. For example, a user interacting with a user interface 103 (FIG. 1) associated with the electronic commerce application 215 and rendered on a display 246 (FIG. 2) of a client device 206 (FIG. 2) may select a component that corresponds to a request to view items. The items can be a list of previously purchased items, recommended items, best seller items, and/or other type of list of items as can be appreciated. For the purpose of this example, the list of items is a list of previously purchased items. In this example, the electronic commerce application 215 may analyze the interaction history data 233 (FIG. 2) to identify items that have been previously purchased by the user.

At box 406, the electronic commerce application 215 determines if any of the previously purchased items are out-of-stock or otherwise unavailable. For example, the electronic commerce application 215 may determine that an item is unavailable based on an evaluation of the item catalog 224 (FIG. 2) and/or item data 239 (FIG. 2) which may include an indication that an item is out-of-stock or otherwise unavailable. If an item is determined to be unavailable, the electronic commerce application 215 proceeds to box 409. Otherwise, the electronic commerce application 215 proceeds to box 412.

At box 409, the item recommendation engine identifies a replacement item. As will be discussed in FIG. 5, the item recommendation engine 218 may identify items that are in the same item category in the item catalog 224 as the unavailable item. By applying the recommendation rules 227 (FIG. 2), the item recommendation engine 218 evaluates a variety of factors associated with the identified items in comparison with the unavailable items and/or preference data 236 (FIG. 2) of the user to select the alternative items. For example, the item recommendation engine 218 may assign weights to various factors and assign a score for each identified item according to a sum of the weighted factors. The item recommendation engine 218 may rank the items and select a highest subset of ranked items as the alternative items for the unavailable item.

At box 412, the electronic commerce application 215 generates a user interface 103 with the item listings 106 (FIG. 1) for each of the requested items. As discussed with respect to FIGS. 1A-1B and 3A-3B, the item listing 106 for the unavailable item can include a first user interface component 109 (FIG. 1A) corresponding to the unavailable item and a plurality of second user interface components 112 corresponding to the alternative items. According to various embodiments, the first user interface component 109 is disabled such that no resulting action occurs in response to a user interaction with the first user interface component 109. In addition, a display region associated with the first user interface component 109 may be at least partially obscured by dimming, shading, or otherwise graying-out.

In contrast, the second user interface components 112 (FIG. 1A) are fully visible to the user and are configured to trigger a modification of the user interface 103 to include a user interface element 115 in response to a user interaction.

At box 415, the electronic commerce application 215 transmits the user interface 103 to a client device 206 for rendering. As such, this portion of the process proceeds to completion.

Figure 5:
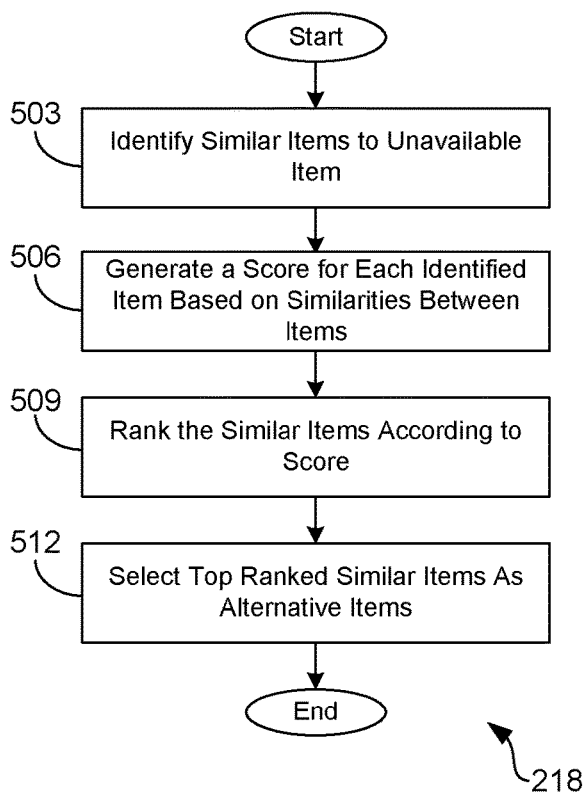
FIG. 5 is a flowchart illustrating one example of functionality implemented as portions of the item recommendation engine executed in a computing environment in the networked environment of FIG. 2 according to various embodiments of the present disclosure.

Referring next to FIG. 5, shown is a flowchart that provides one example of the operation of a portion of the item recommendation engine 218 according to various embodiments. It is understood that the flowchart of FIG. 5 provides merely an example of the many different types of functional arrangements that may be employed to implement the operation of the portion of the item recommendation engine 218 as described herein. As an alternative, the flowchart of FIG. 5 may be viewed as depicting an example of elements of a method implemented in the computing environment 203 (FIG. 2) according to one or more embodiments.

Beginning with box 503, the item recommendation engine 218 identifies items that are similar to an out-of-stock or temporarily unavailable item. For example, the item catalog 224 (FIG. 2) can be organized according to a taxonomy of categories of item type. As such, the unavailable item can be one of multiple items of the same item type that are included in the same category. To this end, the item recommendation engine 218 may identify the other items in the same category as the unavailable item.

At box 506, the item recommendation engine 218 can generate a score for each identified item based at least in part on similarities between the items. For example, the item recommendation engine 218 may apply the recommendation rules 227 (FIG. 2) to analyze various factors associated with the different items. The factors may include for example, item data (e.g., item attributes 241, item title 243, price, etc.), interaction history data 233 (FIG. 2), preference data 236 (FIG. 2), user location and/or region, and/or other factors. For example, item attributes 241 (FIG. 2), item titles 243 (FIG. 2), and other factors associated with the identified items can be compared with the unavailable item to determine a similarity.

In some embodiments, the item recommendation engine 218 can assign a weight to one or more of the factors. The sum of the weighted factors can be used as the score for each of the items. In some embodiments, the user preference data 236 can be applied such that the scores assigned to the items further reflect known or otherwise learned user data 221 that is specific to the user and/or user account.

At box 509, the item recommendation engine 218 can rank the identified items according to the scores. At box 512, the item recommendation engine 218 can select a subset of highest ranked items as the alternative items to present to the user. Thereafter, this portion of the item recommendation engine 218 ends.

Figure 6:
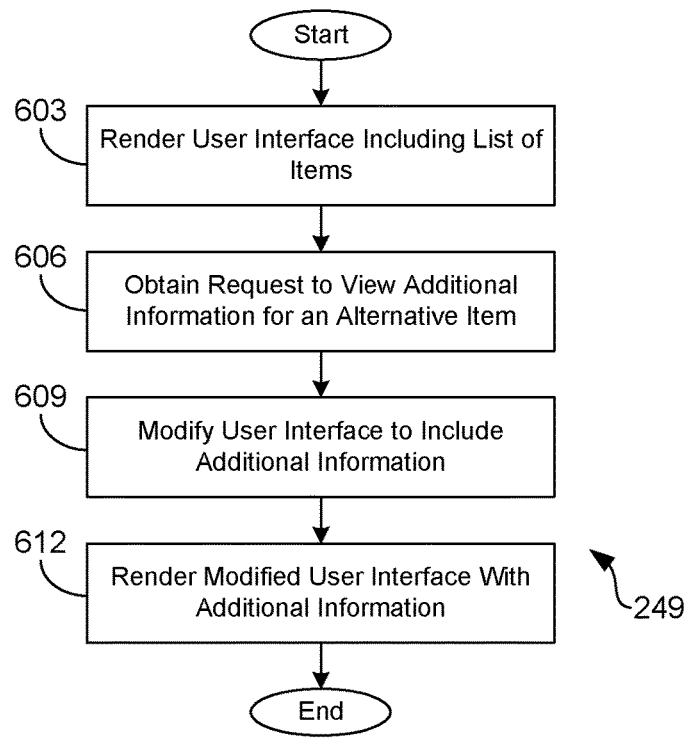
FIG. 6 is a flowchart illustrating one example of functionality implemented as a portion of a client application executed in a client device in the networked environment of FIG. 2 according to various embodiments of the present disclosure.

Referring next to FIG. 6, shown is a flowchart that provides one example of the operation of a portion of the client application 249 or other applications according to various embodiments. It is understood that the flowchart of FIG. 6 provides merely an example of the many different types of functional arrangements that may be employed to implement the operation of a portion of the client application 249 as described herein. As an alternative, the flowchart of FIG. 6 may be viewed as depicting an example of elements of a method implemented in the client device 206 (FIG. 2) according to one or more embodiments.

Beginning with box 603, the client application 249 renders a user interface 103 (FIG. 1) received from the electronic commerce application 215 (FIG. 2) that includes a list of items. Included in the list of items is an item listing 106 (FIG. 1) for an unavailable item. As discussed with respect to FIGS. 1A-1B and 3A-3B, the item listing 106 for the unavailable item may include a first user interface component 109 (FIG. 1A) corresponding to the unavailable item and a plurality of second user interface components 112 (FIG. 1A) corresponding to the alternative items. According to various embodiments, the first user interface component 109 is disabled such that no resulting action occurs in response to a user interaction with the first user interface component 109. In addition, a display region associated with the first user interface component 109 may be at least partially obscured (e.g., dimmed, shaded, transparent, grayed-out, etc.).

At box 606, the client application 249 obtains a request to view additional information with respect to a particular alternative item. For example, an item listing 106 associated with the unavailable item includes second user interface components 112 associated with the selected alternative items that in response to a user interaction (e.g., hover action, component selection, etc.), cause a user interface view to be modified to include additional information. The second user interface component 112, when rendered, may include any number of user interface elements 115 (FIG. 1B), such as, for example, checkboxes, buttons, radio buttons, form fields, images, text labels, links, sliders, spinners, drop-down boxes, and so on. The request to view additional information with respect to a particular alternative item may be in response to a user interaction with the second user interface component 112 associated with the particular alternative item.

At box 609, the client application 249 modifies the user interface 103 to include additional information about the interacted alternative item. For example, the additional information may include item attributes (e.g., an item price) for the alternative item, a description of the alternative item, a notification 118 (FIG. 1B) including an item characteristic that may indicate to the user why the alternative item was recommended (e.g., top seller, conventional version of unavailable item (e.g., non-organic version if unavailable item is organic), most similar in texture, etc.) and/or other information associated with the item.

In some embodiments, the user interface 103 comprises user interface code that can be executed by the client application 249 in response to a user interaction with the second user interface component 112. In other embodiments, the client application 249 notifies the electronic commerce application 215 of the interaction, and the electronic commerce application 215 generates and transmits a modified user interface 103 according to the user interaction.

According to various embodiments, the user interface 103 can be modified to include additional information about the particular alternative item. For example, the user interface 103 can be modified to include a pop-up window that includes information regarding the particular alternative item. In another example, the user interface 103 can be modified to include an overlay component that includes the additional information. In another example, the user interface 103 can be modified such that a card component containing the additional information is presented relative to the item listing 106.

At box 612, the client application 249 renders the modified user interface 103 and this portion of the client application 249 proceeds to completion.

Figure 7:
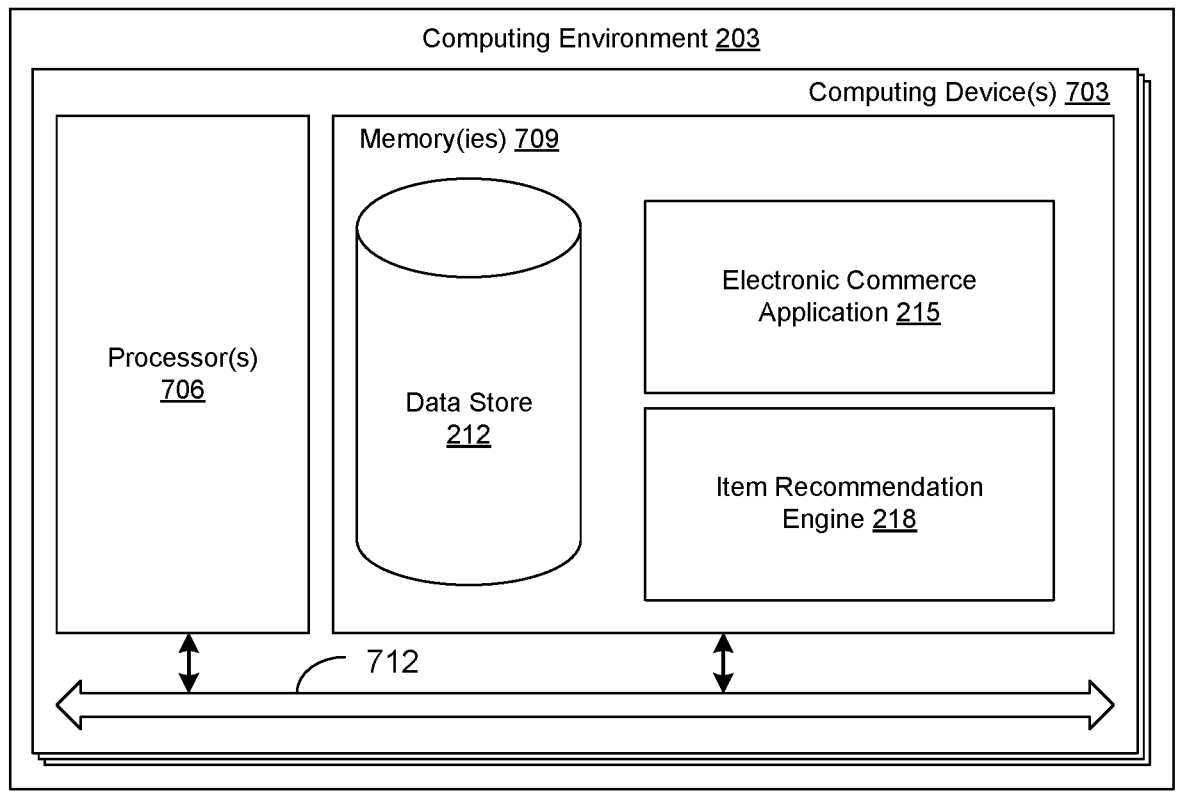
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 703. Each computing device 703 includes at least one processor circuit, for example, having a processor 706 and a memory 709, both of which are coupled to a local interface 712. To this end, each computing device 703 may comprise, for example, at least one server computer or like device. The local interface 712 may comprise, for example, a data bus with an accompanying address/control bus or other bus structure as can be appreciated.

Stored in the memory 709 are both data and several components that are executable by the processor 706. In particular, stored in the memory 709 and executable by the processor 706 are the electronic commerce application 215, the item recommendation engine 218, and potentially other applications. Also stored in the memory 709 may be a data store 212 and other data. In addition, an operating system may be stored in the memory 709 and executable by the processor 706.

It is understood that there may be other applications that are stored in the memory 709 and are executable by the processor 706 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 709 and are executable by the processor 706. In this respect, the term "executable" means a program file that is in a form that can ultimately be run by the processor 706. Examples of executable programs may be, for example, a compiled program that can be translated into machine code in a format that can be loaded into a random access portion of the memory 709 and run by the processor 706, source code that may be expressed in proper format such as object code that is capable of being loaded into a random access portion of the memory 709 and executed by the processor 706, or source code that may be interpreted by another executable program to generate instructions in a random access portion of the memory 709 to be executed by the processor 706, etc. An executable program may be stored in any portion or component of the memory 709 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 709 is defined herein as including both volatile and nonvolatile memory and data storage components. Volatile components are those that do not retain data values upon loss of power. Nonvolatile components are those that retain data upon a loss of power. Thus, the memory 709 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 706 may represent multiple processors 706 and/or multiple processor cores and the memory 709 may represent multiple memories 709 that operate in parallel processing circuits, respectively. In such a case, the local interface 712 may be an appropriate network that facilitates communication between any two of the multiple processors 706, between any processor 706 and any of the memories 709, or between any two of the memories 709, etc. The local interface 712 may comprise additional systems designed to coordinate this communication, including, for example, performing load balancing. The processor 706 may be of electrical or of some other available construction.

Although the electronic commerce application 215, the item recommendation engine 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-6 show the functionality and operation of an implementation of portions of the electronic commerce application 215, item recommendation engine 218, the client application 249, and/or other applications. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 706 in a computer system or other system. The machine code may be converted from the source code, etc. If embodied in hardware, each block may represent a circuit or a number of interconnected circuits to implement the specified logical function(s).

Although the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. Further, in some embodiments, one or more of the blocks shown in FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 215, item recommendation engine 218, and the client application 249, that comprises software or code can be embodied in any non-transitory computer-readable medium for use by or in connection with an instruction execution system such as, for example, a processor 706 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce application 215, item recommendation engine 218, and the client application 249, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 703, or in multiple computing devices 703 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   receive a request to view a plurality of previously purchased items associated with a user account;
   determine that a particular item of the plurality of previously purchased items is unavailable;
   identify a plurality of available items that are included in a same item category as the particular item;
   for individual available items of the plurality of available items:
      assign a respective weight to individual factors of a plurality of factors associated with the individual available items based at least in part on a level of importance associated with the individual factors, the plurality of factors comprising one or more item attributes of the individual available items, a comparison of words within item titles between the particular item and the individual available items, and a comparison of ratios between a quantity associated with the particular item and a quantity associated with the individual available items, the respective weight being used to assess a level of similarity between the particular item and the individual available items, and the respective weight being one of a positive weight or a negative weight;
      generate a respective score for the available item based at least in part on a sum of weights assigned to the plurality of factors, the respective score being used to generate a hierarchical ranking of the plurality of available items;
   select a plurality of alternate items from the plurality of available items based at least in part on the hierarchical ranking and user preference data associated with the user account; and
   generate a user interface comprising an item listing associated with the particular item, the item listing comprising a first user interface object corresponding to the particular item and a plurality of second user interface objects corresponding to the plurality of alternate items, the plurality of second user interface objects being arranged on the user interface according to the hierarchical ranking, the first user interface object being disabled and a display region associated with the first user interface object being at least one of dimmed, shaded, grayed-out, or transparent, and the plurality of second user interface objects being enabled such that a user interaction with a respective second user interface object of the plurality of second user interface objects triggers a modification of a user interface view to include a user interface element that includes an item characteristic indicating why a corresponding alternate item associated with the respective second user interface object was selected; and
   transmit the user interface to a client device.

2. The non-transitory computer-readable medium of claim 1, wherein the user interface element further includes additional information about the corresponding alternate item in response to the user interaction with the respective second user interface object.

3. The non-transitory computer-readable medium of claim 1, wherein the user interface element comprises a card component, a pop-up window, or an overlay interface.

4. The non-transitory computer-readable medium of claim 3, wherein selecting the plurality of available items associated with the particular item comprises:
  identifying a plurality of related items to the particular item in an item catalog; and
  selecting the plurality of available items from the plurality of related items based at least in part on a comparison of item attributes.

5. A system, comprising:
  at least one computing device; and
  at least one application executable in the at least one computing device, wherein when executed the at least one application causes the at least one computing device to at least:
    determine that a particular item associated with a user account is unavailable;
    identify a plurality of available items that are included in a same item category as the particular item;
    for individual available items of the plurality of available items;
    assign a respective weight to individual factors of a plurality of factors associated with the individual available items based at least in part on a level of importance associated with the individual factors, the plurality of factors comprising one or more item attributes of the individual available items, a comparison of words within item titles between the particular item and the individual available items, and a comparison of ratios between a quantity associated with the particular item and a quantity associated with the individual available items, the respective weight being used to assess a level of similarity between the particular item and the individual available items, and the respective weight being one of a positive weight or a negative weight;
      generate a respective score for the available item based at least in part on a sum of weights assigned to the plurality of factors, the respective score being used to generate a hierarchical ranking of the plurality of available items;
    identify a plurality of alternate items from the plurality of available items based at least in part on the hierarchical ranking and user preference data associated with the user account; and
    generate a user interface comprising an item listing for the particular item, the item listing comprising a first user interface object corresponding to the particular item and a plurality of second user interface objects corresponding to the plurality of alternate items, the plurality of second user interface objects being arranged on the user interface according to the hierarchical ranking, and individual second user interface objects being configured such that a user interaction with a respective second user interface object triggers a modification of a user interface view to include a user interface element that indicates why a corresponding alternate item associated with the individual second user interface objects was presented as an alternate to the particular item.

6. The system of claim 5, wherein a display region of the first user interface object is at least one of shaded, dimmed, transparent, or grayed-out, and a respective display region of individual second user interface objects of the plurality of second user interface objects is non-obscured.

7. The system of claim 5, wherein the first user interface object is disabled and the plurality of second user interface objects is enabled.

8. The system of claim 7, wherein the user interface element further provides additional information about the corresponding alternate item.

9. The system of claim 8, wherein the user interface element comprises at least one of a user interface overlay, a card component, or a pop-up window.

10. The system of claim 5, wherein the user interaction comprises a hovering action.

11. The system of claim 5, wherein, when executed, the at least one application causes the at least one computing device to at least identify a plurality of category-related items to the particular item based at least in part on an item catalog taxonomy, the plurality of category-related items being in a same category as the particular item.

12. The system of claim 11, wherein, when executed, the at least one application causes the at least one computing device to at least select the plurality of available items from the plurality of category-related items based at least in part on a comparison of a plurality of item attributes between the particular item and individual items of the plurality of category-related items.

13. The system of claim 11, wherein, when executed, the at least one application further causes the at least one computing device to at least:
  rank the plurality of available items based at least in part on the respective score.

14. A method, comprising:
  rendering, via a client device, a user interface comprising a first user interface object corresponding to an unavailable item and a plurality of second interface objects corresponding to a plurality of alternative items that are similar to the unavailable item, the plurality of alternative items being selected according to a respective score associated with individual alternative items of the plurality of alternative items, the respective score being determined by:
    assigning a respective weight to individual factors of a plurality of factors associated with the individual alternative items based at least in part on a level of importance associated with the individual factors, the plurality of factors comprising one or more item attributes of the individual alternative items, a comparison of words within item titles between the unavailable item and the individual alternative items, and a comparison of ratios between a quantity associated with the unavailable item and a quantity associated with the individual alternative items, the respective weight being used to assess a level of similarity between the unavailable item and the individual alternative items, and the respective weight being one of a positive weight or a negative weight; and
    generating a respective score for the individual alternative items based at least in part on a sum of weights assigned to the plurality of factors, the respective score being used to generate a hierarchical ranking of the plurality of alternative items,
  and the plurality of second user interface objects being arranged on the user interface according to the hierarchical ranking;
  identifying, via the client device, a user interaction with a particular second user interface object of the plurality of second user interface objects, the particular second user interface object being associated with a particular alternative item of the plurality of alternative items; and
  modifying, via the client device, the user interface to include a user interface element that provides additional information about the particular alternative item, the additional information include an indication as to why the particular alternative item was selected as an alternate to the unavailable item.

15. The method of claim 14, wherein the user interface comprises user interface code configured to modify the user interface to include the user interface element, and further comprises executing, via the client device, the user interface code.

16. The method of claim 14, wherein the user interface element comprises a selectable component configured to initiate a purchase of the particular alternative item.

17. The method of claim 14, wherein the user interface element comprises a plurality of selectable components associated with a remainder of the plurality of alternative items, individual selectable components of the plurality of selectable components being configured to trigger an update of the additional information in the user interface element, the updated additional information corresponding to a respective other alternative item.

18. The method of claim 14, wherein a display region associated with the first user interface object being at least one of dimmed, shaded, grayed-out, or transparent.

19. The method of claim 14, wherein the first user interface object is disabled and the plurality of second interface objects is enabled.

20. The method of claim 14, further comprising:
sending, via the client device, a request to view a list of previously purchased items; and
receiving, via the client device, the user interface from at least one computing device, the user interface including the list of previously purchased items, and the unavailable item corresponding to a particular one of the previously purchased items.

\* \* \* \* \*